UNITED STATES PATENT OFFICE.

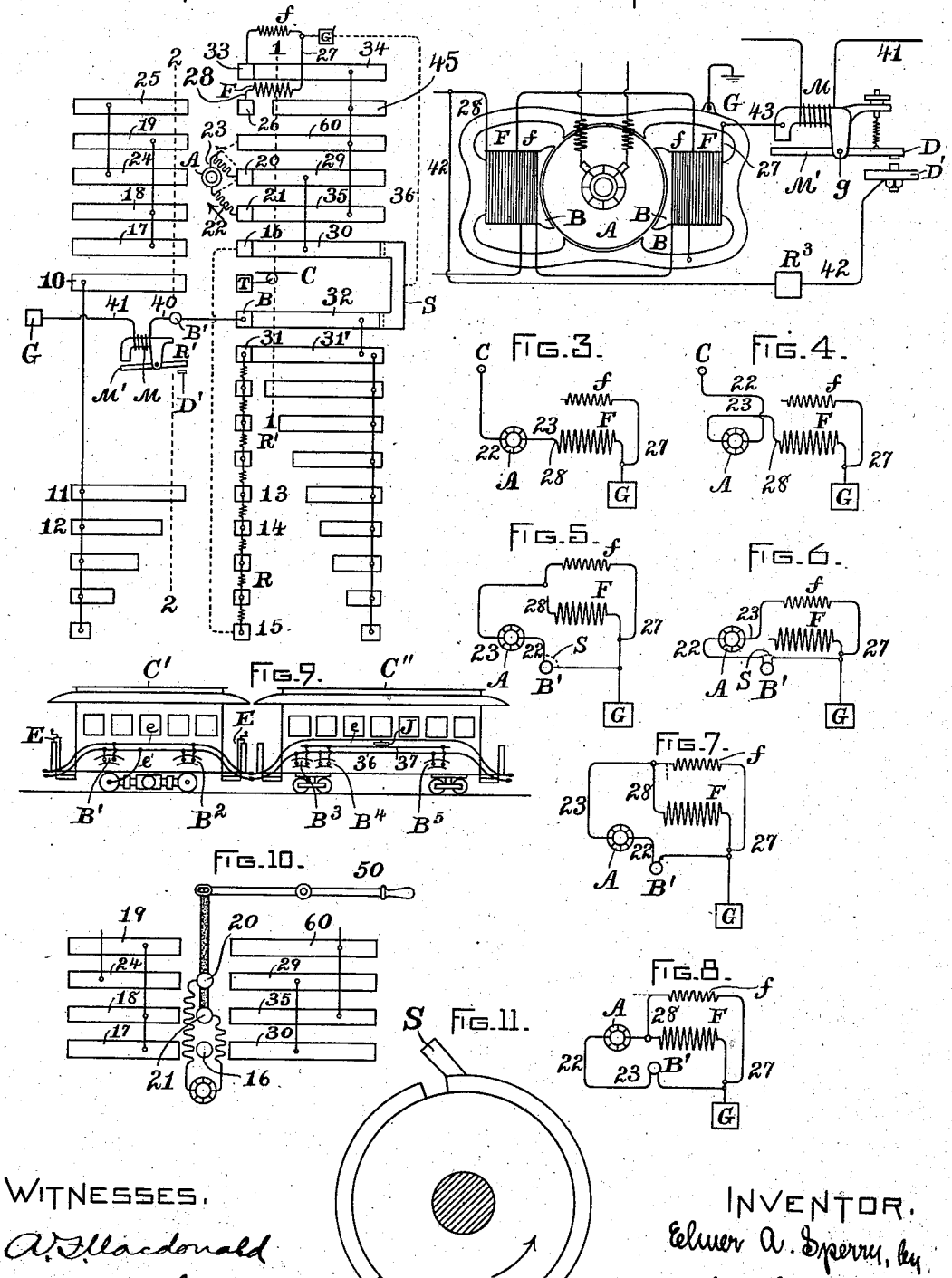

ELMER A. SPERRY, OF CLEVELAND, OHIO, ASSIGNOR TO THE GENERAL ELECTRIC COMPANY, OF NEW YORK.

ELECTRIC BRAKE.

SPECIFICATION forming part of Letters Patent No. 577,119, dated February 16, 1897.

Application filed February 19, 1895. Serial No. 539,019. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Electric Brakes, of which the following is a specification.

The present invention relates to controllers and a system of control for an electric motor or motors, particularly when used for propelling vehicles either on street or other kinds of railways where the motors are used for propelling the vehicle, and when it is desired to stop the motors are converted into generators, and the energy thus produced is supplied to a system of electric brakes.

In running a car or train it often happens that it will, with the source of power cut off, run on its own momentum for some little time, as on a slight grade or a level. The power being shut off and the circuits through the motor or motors open, the magnetization of the field dies down, the amount remaining depending upon the residual magnetism of the pole-pieces, which varies according to the style of motor and the kind of iron used in its field. It is desirable to always maintain a certain amount of field magnetization, so that the motors, when converted into generators by suitable connecting devices, may be instantly responsive to any demand for energy. Especially is this the case where there are poor contacts between parts of the system which would require considerable energy to burn them out, and in consequence of the high resistance of the circuit the machine would build up slowly, thus taking a certain interval of time, which, as will readily be seen, would be a serious objection were it necessary to stop instantly on account of danger. To overcome this objection, I wind a separate field-coil on the pole-pieces of the motor, which may or may not form a part of the main field-winding of the motor. In this application, however, I have shown it separate from the main winding and only in circuit at certain intervals, namely, when the power-circuit is interrupted and the controller in what is known as the "off" position. The brushes and contacts of the controller are so arranged with respect to each other that when the power-handle is thrown to the "off" position the armature connections are reversed and the circuit is completed through the extra or auxiliary field-coil. This coil being in circuit with the armature will always maintain a certain amount of field magnetization so long as the car is running under the conditions above described, and if it be desired to stop the generator will be instantly responsive to any demand for energy. An essential difference between this controller and other existing types is that a field is maintained for the motor or generator after the power-circuit has been interrupted, while the circuit from other controllers to the motor or generator is interrupted when in the "off" position. In the present case there is always a circuit between the controller and motor or generator.

In a system as above described it has been found that the current generated by the motors when converted into generators is too great at the start, and to take care of this excess of current more resistance is inserted on the brake side than on the power side of the controller, the extra resistance being divided into any suitable number of sections and cut out step by step when the brake-cylinder is operated. This extra resistance is idle except when the brake-circuit is completed. The current for the brake-circuit flows through both main and extra resistance, while the current from the power system flows through the main alone.

An automatic limit-switch is provided for cutting down the current of the generator if at any time the current flowing through the brake-circuit is excessive, due to the fact that the motorman cuts out resistance too fast or for any other reason, and the apparatus is thereby endangered. The switch consists of a magnet with an energizing-coil in series with the brakes, having its armature pivoted at the center of gravity, thereby greatly lessening the vibration due to the jolting of the vehicle and adapted to close a pair of contacts, putting a shunt of more or less resistance around the field-coils of the generator, weakening them and causing the current generated to be decreased. Upon a predetermined drop in the current supplied by the generator the shunt-circuit around the fields is automatically broken, and the switch is ready to operate again immediately upon an excess of current.

When operating electric brakes used in connection with motor and trail cars, it sometimes occurs that the contact with the rail or ground is better at the trail-car than at the motor-car, and if the brakes are connected in multiple, with the ground forming one side, this will lead to difficulties, because when the power is supplied to the motors in the usual way by a circuit grounded on the axle the current instead of going through the wheel of the motor-car to ground will go through the coil on the brake-magnet of the motor-car, which is grounded on the axle, thence through the brake-magnet coils on the trailer or trailers to ground, thus setting the brakes on both motor and trail cars. Where the train is only lightly loaded, this is not so serious a matter, for the motor can overcome the effect of its brakes and drag the train with the set brakes to a point where the ground contact of the motor is good. Then the brakes will free themselves and the train will proceed as before; but if the train is heavily loaded it cannot start until good contact is made at the motor-car. To overcome this difficulty, I propose to connect the brakes in multiple, as before, but instead of grounding each individual brake-coil on its own axle the ground ends of the magnet-coils are connected to a separate wire, which extends through the train and is grounded on the motor-car. If now the contact of the wheels on the motor-car be poor, it will only affect the passage of the current through the motor or motors and will have no effect on the brakes.

When a train is composed of a motor-car and a trailer or a number of trailers, it is necessary to provide some means for adjusting the flow of current through the brake-magnets. This adjustment may be effected to conform to differences in weight of the cars, to compensate for the difference in the total retardation of mechanism upon the trail-cars, or the combined effect of the retarding action of the brakes upon the motor-car, and, lastly, to compensate for the difference in electrical resistance in the brake-magnet coils or groups. This is accomplished by inserting suitable resistances in circuit with the various brakes in such a manner as to give to each car just enough braking effect to handle its own load independent of the other cars on the train. For example, the brakes of the motor-car may be connected in simple multiple and those on the trailers in multiple with each other, but in series with the source of supply, with a suitable regulating device between the source and the brakes for varying the current supplied thereto.

In Patent No. 569,305, dated October 13, 1896, I have shown an auxiliary field-coil which is adapted to energize the field-magnets of the motor at the interval between the shutting off of the source of power supplied to drive the car and the completion of the brake-circuit, the motor being connected in such a manner as to act as a generator and supply current thereto. The auxiliary field is normally in circuit with the main source of supply, but on failure of the supply, due to the trolley coming off or for any other reason, the terminals of the auxiliary field-coil are automatically shifted to the armature of the motor and continue to be in circuit therewith for any predetermined length of time.

The application above referred to, while embodying some of the features of the present invention, is not intended to broadly cover the features herein contained, but is specific to the arrangement shown.

The present application includes in its scope the one referred to and contemplates in its broad aspect the use of any auxiliary field-coil which is used to energize the field-magnets of a motor or motors at the time when they shall be receiving no power from the main source of supply and before they are coupled in circuit with the brakes.

It is also within the scope of this invention to keep the auxiliary field-coil in circuit with the armature while supplying current to the brakes.

Figure 1 is a diagrammatic view of the controller, showing the circuit connections through a motor and exhibiting two sets of contacts which are mounted on the same insulating-cylinder and separated from each other by an intervening space and a third set adapted to receive connections from the outside circuit. Fig. 2 is a diagrammatic view of a motor and an automatic shunting device for the field thereof. Figs. 3 and 4 illustrate a diagrammatic view of the motor and circuit connections to the source of electrical supply when the motor is operating in two directions. Figs. 5 and 6 indicate automatic circuit connections with the controller in the "off" position, and the motor is acting as a generator while traveling in either direction, and the auxiliary field-coil is connected to the armature-terminals. Figs. 7 and 8 show the motor operating as a generator running in the two directions when the controller is so positioned that the armature-current is compelled to flow through the main field-coils of the motor or motors, but otherwise they are the same as Figs. 5 and 6. Fig. 9 represents the circuit connections of the brake-magnets between the controller and the said magnets located upon both the motor-car and trailer and illustrating means for adjusting the current flowing to the brake-magnets of one car in relation to those of the other. Fig. 10 is a detail view of the reversing-switch. Fig. 11 is a detail view of the shunting device.

Like letters and numerals of reference indicate like parts throughout the several views.

The brushes or contacts are mounted in a vertical line, with the contacts for controlling the motor mounted on the left and those for controlling the brake on the right. The brushes are now in the "off" position and, unlike controllers heretofore, are in engagement with certain of the contact-plates on the brake side of the controller. With the brushes in this position the auxiliary high-resistance field coil or coils are connected to the armature-terminals which have been reversed by means of the cross connections on the cylinder, and the motor is now a generator, feeding current through this field-coil.

Assuming that the brushes are on the line 2 2 at the left of the central position, the current will be supplied to the motor in a manner suitable to propel the car, and the circuits would be as follows: from the source of current C to the brush T, contact-plate 10, cross-connected to plate 11, to brush 13, through resistance R to brush 15, cross-connected to brush 16, to contact 17, cross-connected to contact 18, to brush 21, through the flexible connection 22 to the armature A of the motor, through the flexible lead 23 to the brush 20, to the plate 24, cross-connected to plate 25, to brush 26, wire 28, to field F, wire 27, to ground. By moving the brushes farther toward the left it will be seen that one section after the other of the resistance is short-circuited until finally the motor is connected directly to the source of power, with no resistance in circuit. This is indicated in Fig. 3. Fig. 4 indicates the same condition of circuits, except that the relation of the field and armature has been reversed by means of the reversing-switch and the motor is rotating in the opposite direction.

Assuming that the brushes are in the position shown in Fig. 1, the motor has been converted into a generator by means of the cross connections between the plates on the brake side which are opposite to those on the power side, and the direction of current flowing through the armature is reversed relative to that of the field.

Assuming now that the car is running on momentum, a current will be generated and the circuit is as follows: from the armature A to the flexible lead 22, the brush 21, plate 35, cross-connected to plate 34, through the relatively high-resistance field-coil $f$, to ground G', thence by way of the dotted line 36 to the shunting device S, to contact 30, cross-connected to contact 29, to brush 20, through the armature in the direction indicated by the dotted arrow, to the point of starting. Thus it will be seen that the shunting device S shunts the brake-coil B' in this position.

It will be seen from the above that the generator is supplying current to the auxiliary field-coil $f$ and that the field F is open-circuited and that the brake-coil B' is shunted by means of the shunting device S, as shown in Figs. 5 and 6, the former indicating the condition when running forward, the latter backward.

Assuming that the cylinder is now rotated so that the brushes rest on the line 1 1 to the right of the "off" position, the circuit will be as follows: from the armature A, through the flexible lead 22, to the brush 21, the plate 35, cross-connected to the plate 45, the brush 26, wire 28, field F, wire 27, to ground G', thence to ground G, through the coil M on the limit-switch, brake-coil B', to brush B, contact 32, cross-connected to plate 31', to brush 31, to resistances R' R, to brush 15, by cross connection to brush 16, to contact-plate 30, cross-connected to plate 29, brush 20, to armature A, as indicated by dotted arrow, to point of starting. This condition of circuits corresponds to that shown in Fig. 7, and it will be noted that the auxiliary field $f$ is short-circuited. This is not essential to the invention, however, for it would work as well were it open-circuited, as shown in dotted lines, and I aim to embrace that feature in the claims. Further rotation of the cylinder merely cuts out more resistance, so further description is unnecessary. Fig. 8 indicates the same condition as above, except that the generator is rotating in the opposite direction. It will be seen by reference to the above that the brake-circuit includes more resistance than the power side, for it includes both resistances R and R', whereas the power-circuit only includes resistance R.

Referring now to Fig. 10, a detail view of the reversing-switch is shown. The brushes 20 and 21 are mounted on a suitable insulating-piece, which is connected with a lever 50, pivoted in any suitable manner and adapted to move the brushes up or down to give the required connections to the armature-leads. The armature A is connected by flexible leads with the brushes 20 and 21, which are adapted to engage plates 29 and 35 or 29 and 60, which are mounted on a suitable cylinder or support. By tracing out the connections it will be seen that the current is reversed whenever the brushes are shifted from one position to the other. This reversing switch is adapted to shift the armature connections when the motor is used to propel the car forward or backward. As this reversing-switch is the subject of my pending application, Serial No. 606,489, filed September 21, 1896, I do not herein make any claim to its construction.

It has been found in practical operation that in the hands of some motormen upon applying the brake the current is turned on too suddenly, and it runs up to a point dangerous to the apparatus. In Figs. 1 and 2 is shown what I term a "limit-switch" for preventing this undue increase of current, which consists in a shunt-wire 42, including any suitable resistance, as $R^3$, and the contacts D and D', the former being mounted on the armature M'; pivoted, preferably, at the center of gravity $g$, the shunt being completed through the magnet-frame and the wire 43. The coil M being in series-circuit relation with the brake-magnets an excess of current will cause the armature M' to be attracted, and the contacts D and D' will momentarily be closed, thus shunting a portion of the current around the fields through the resistance R³ and wire 42. It is preferable to support this armature at or about its center of gravity for the purpose of reducing to a minimum the amount of vibration which a lever of this kind would be subjected to, caused by the jolting of the vehicle. A suitable spring and adjusting-nut are provided to regulate its action.

Referring now to Fig. 9, C' indicates the motor-car, and C the trailer. The controller E is coupled to the motor, as shown in Fig. 1, and to the brake-magnets B' and B² in simple multiple are by means of wires e and 36. This, however, is not the case with the brake-magnets B³, B⁴, and B⁵. These are placed in multiple between the wires 36 and 37 and in series with an adjusting-coil J, inserted between wire e and 37 and consisting of any suitable resistance, with means for varying it, by means of which the current flowing to the group of magnets on the trail-car C may be adjusted with reference to the group upon the motor-car C'. The circuit between the brakes is a metallic one, and the return-circuit is grounded by wire e' on the axle of the motor-car.

Fig. 11 is a detail view showing the cylinder in cross-section and the relation which the brushes bear to the shunting device S. This shunting device S consists of two brushes mounted on the back of the controller in any suitable manner, connected together and adapted to engage with contact-plates 30 and 32 when in the position shown in Fig. 1. As soon as the cylinder is rotated in the direction of the arrow the brushes 16 and B, which are connected to the external circuit, break contact with the contacts 30 and 32 and the shunting device S remains idle, there being no current in the circuit. If the controller is revolved in the opposite direction, one of the brushes of the shunting device S engages with contact 17 and the other brush is open-circuited. Thus it will be seen that the shunt S is only in circuit when the controller stands as in Fig. 1.

What I claim is—

1. In an electric brake system, the combination of a dynamo-electric machine having a series and shunt field-coil and adapted for propelling and braking the vehicle, with means for maintaining a field magnetization at the time the dynamo-electric machine is not affecting the motion of the vehicle.

2. In an electric brake system, the combination of a motor for propelling and braking the vehicle, with an auxiliary field-coil for energizing the field-magnets at the time the motor is not affecting the propulsion of the vehicle.

3. The combination with an electric motor, of an auxiliary field-coil, and means for automatically connecting the coil in circuit with the motor when the source of supply is interrupted.

4. The combination of an electric motor having main and auxiliary field-coils, means for reversing the relation between the armature and fields, and means for connecting the auxiliary field-coil to the armature at a time when the motor is not affecting the propulsion of the car.

5. In a controller for electric motors, the combination of contacts and connections for regulating the supply of energy to the power side and to the brake side of the system, an auxiliary field-coil, and brushes and connections for establishing various combinations in the circuit relations, certain of the brushes engaging with the contacts when the power and brake circuits are interrupted, for the purpose of energizing the auxiliary field-coil.

6. In an electric controller, the combination of contacts for regulating the supply of current to the motor or motors, contacts for regulating the supply of energy to the brake-circuit, brushes for establishing connection between the motor-circuit and the contacts, and a field-coil for energizing the field of the motor in the "off" position of the controller.

7. The combination with an electric motor, of an auxiliary field-coil of relatively high resistance, and brushes and contacts for including the said coil in circuit with the motor-armature at the "off" position of the controller.

8. In a controller for electric motors, the combination of contacts for establishing circuit connections with the motors when propelling the vehicle, other contacts for regulating the supply of current to the brakes when the motors are converted into generators and supplying current to the brakes, and means for establishing a connection between the armature and an auxiliary field-coil between the times when the power-circuit is broken and the brake-circuit established.

9. In combination, an electric motor, main and auxiliary field-coils, contacts and brushes for establishing connection between the main field and the armature of the motor, and other contacts for establishing circuit relation between the armature and the auxiliary field-coil.

10. In combination, an electric motor provided with main and auxiliary field-coils, a controller for regulating the current flowing through the motor, means for reversing the relation between armature and field-coils, and contacts and brushes for connecting the auxiliary field-coil in circuit with the armature.

11. In an electric-brake system, the combination of means for placing the motor in operative connection with a source of electrical supply so as to be driven as a motor, means for reversing the relation of the armature and field of the motor and operatively connecting the armature-circuit to an auxiliary field coil or coils on the motor, and means for coupling the armature to a low-resistance field-circuit of the motor.

12. The combination, with a series electric machine having an auxiliary field-coil, of means for disconnecting either one or the other of such field-coils from the armature-circuit, and a reversing-switch for the armature-circuit.

13. The combination, with a series electric machine having an auxiliary field-coil, of means for disconnecting either one or the other of such field-coils from the armature-circuit, a reversing-switch for the armature-circuit, a plurality of exterior circuits, and means for coupling them successively to the said motor.

14. In an electric controller, the combination of a plurality of circuits, certain of which are for regulating the current supplied to the motors, certain others for regulating the energy supplied to the brakes, resistance included in the first-named circuit, and the said resistance plus other resistance included in the brake-circuit.

15. The combination of a dynamo-electric machine for propelling and braking purposes, means for including the machine in circuit with the source of supply when it is desired for propelling purposes, and for disconnecting it from the supply and converting it into a generator for braking purposes, and an automatic switch for closing and opening a shunt-circuit around the field-coils of the dynamo-electric machine when acting as a generator for preventing an increase of current over a predetermined amount.

16. The combination of a dynamo-electric machine mounted on a vehicle for propelling and braking purposes, a controller for including the machine in circuit with the source of supply and regulating the energy supplied thereto, and for disconnecting the machine from the supply, converting it into a generator and regulating the energy supplied thereby to the brake-circuit, and an automatic device for shunting a part of the current around the machine when it is acting as a generator.

17. The combination of a dynamo-electric machine for propelling and braking purposes, a controller for regulating the machine when employed for propelling and braking purposes, and an automatic switch controlled by the current in the brake-circuit for closing a shunt around the field-coils of the machine when it is acting as a generator.

18. The combination of an electric motor, a controller provided with means for converting it into a generator, an auxiliary field-coil, means for establishing connection between the field-coil and the armature, and an automatic shunting device for the generator.

19. In combination with a series electric motor, a plurality of exterior circuits, means for changing the circuit connection of said motor from one to the other of the said exterior circuits, a device for converting the motor into a generator, operated by such means, and means for automatically weakening the field magnetization of the generator without directly altering the current in the armature, said means responsive to current produced by the generator when such current rises or tends to rise above a predetermined amount.

20. In combination with a series electric motor, a plurality of exterior circuits, means for changing the circuit connection of the said motor from one to the other of the said exterior circuits, a device for converting the motor into a generator operated by such means, and an automatic shunt for the field-magnet coil of such generator, the said shunt being responsive to the current in one of said exterior circuits.

21. The combination of an electric motor, a controller for regulating the same a plurality of circuits extending therefrom, more resistance included in one circuit than in the others, main and auxiliary field-coils for the motor, and means for connecting them in any desired relation with the armature.

22. The combination of a series-wound dynamo-electric machine for propelling and braking purposes, means for including it in circuit with the source of supply when it is desired to propel the vehicle, and for disconnecting it from the supply and converting it into a generator, and an automatic limit-switch for shunting the same when it is used for braking.

23. The combination of a vehicle, a dynamo-electric machine for propelling and braking purposes mounted thereon, means for including the machine in circuit with the source of supply when employed for driving the load and for disconnecting it from the supply and converting it into a generator for braking purposes, and for regulating the braking energy when so connected, and automatic means controlled by the current in the brake-circuit for preventing the locking of the vehicle-wheels by means of the brake-magnets.

24. The combination of a dynamo-electric machine for propelling and braking a vehicle, with means for maintaining a field magnetization at all times when the vehicle is in motion.

25. The combination in an electric-brake system, of brakes on the motor-car connected in parallel, brakes on the trailer connected in a group, and a resistance for regulating the supply of energy to the group.

26. The combination in an electric-brake system, of brakes on the motor-car connected in parallel, brakes on the trailer connected in a group, the members of the group connected in parallel with each other, and the group as a whole connected in series with the source of supply.

27. In an electric-railway system, the combination of means for placing the motor in operative connection with a source of electrical supply so as to be driven as a motor, means for reversing the relation of the field and armature of the motor and operatively connecting the armature-circuit to an auxiliary field coil or coils on the motor, circuits for establishing connection between the motor and the brakes, means for closing a shunt around the brakes, and means for simultaneously coupling the armature-circuit with a low-resistance field-coil and opening said shunt.

28. In an electric-brake system, the combination of a dynamo-electric machine for propelling and braking the car, a controller provided with contacts and brushes for establishing desired circuit relations, and a shunting device for the brake-magnets.

29. In an electric-brake system, the combination of a dynamo-electric machine for propelling and braking the car, a controller provided with contacts and brushes for establishing connections between the dynamo-electric machine and the brake-magnet coils, and a mechanical shunting device for shunting the brake-magnet coils at a predetermined time.

ELMER A. SPERRY.

Witnesses:
S. BRASHEARS, Jr.,
JAMES BROWN.